(12) United States Patent
Anderson et al.

(10) Patent No.: US 10,140,011 B2
(45) Date of Patent: Nov. 27, 2018

(54) TOUCH INTELLIGENT TARGETING

(75) Inventors: Jen Anderson, Kirkland, WA (US);
Eric Christian Brown, Seattle, WA (US); Jennifer Teed, Redmond, WA (US); Goran Predovic, Redmond, WA (US); Bruce Edward James, Shoreline, WA (US); Fei Su, Issaquah, WA (US); Maybelle Lippert, Redmond, WA (US); Mudit Agrawal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 723 days.

(21) Appl. No.: 13/209,058

(22) Filed: Aug. 12, 2011

(65) Prior Publication Data
US 2013/0038540 A1   Feb. 14, 2013

(51) Int. Cl.
G06F 3/0488    (2013.01)
G06F 3/041     (2006.01)
G06F 3/0484    (2013.01)

(52) U.S. Cl.
CPC .......... *G06F 3/0488* (2013.01); *G06F 3/0416* (2013.01); *G06F 3/04842* (2013.01)

(58) Field of Classification Search
USPC ................................................. 345/173–175
See application file for complete search history.

(56) References Cited

U.S. PATENT DOCUMENTS

| | | | |
|---|---|---|---|
| 6,040,824 A | 3/2000 | Maekawa et al. | |
| 6,573,844 B1 | 6/2003 | Venolia et al. | |
| 6,654,733 B1 | 11/2003 | Goodman et al. | |
| 7,170,017 B2 | 1/2007 | Chiang et al. | |
| 2005/0110769 A1 | 5/2005 | DaCosta et al. | |
| 2007/0097096 A1 | 5/2007 | Rosenberg | |
| 2008/0094356 A1 | 4/2008 | Ording et al. | |
| 2008/0259041 A1 | 10/2008 | Blumenberg et al. | |

(Continued)

FOREIGN PATENT DOCUMENTS

| | | |
|---|---|---|
| CN | 101529368 A | 9/2009 |
| CN | 101833392 A | 9/2010 |
| EP | 1674976 A2 | 6/2006 |
| JP | H0887395 A | 4/1996 |
| JP | 2001-141504 A | 5/2001 |
| JP | 2001-175375 A | 6/2001 |

(Continued)

OTHER PUBLICATIONS

"New Apple Patents Reveal Work on Touch Sensitive Bezel Interface on iPad", iPhone Hacks, http://www.iphonehacks.com/2010/02/new-apple-patents-reveal-work-on-touch-sensitive-bezel-interface-on-ipad.html, accessed May 4, 2011, 2 pages.

(Continued)

*Primary Examiner* — Robin Mishler
(74) *Attorney, Agent, or Firm* — Baker & Hostetler LLP

(57) ABSTRACT

User inputs can indicate an intent of a user to target a location on a display. In order to determine a targeted point based on a user input, a computing device can receive an indication of at least one point, an indication of a width, and an indication of a height. The computing device can estimate a portion of the display based on the indication of the at least one point, the indication of the width, and the indication of the height. The computing device can also determine the targeted point based on a location of the at least one point and based on a location of a portion of one or more objects within the estimated portion of the display.

19 Claims, 16 Drawing Sheets

(56) References Cited

U.S. PATENT DOCUMENTS

| | | | |
|---|---|---|---|
| 2009/0195506 A1 | 8/2009 | Geidl et al. | |
| 2010/0079405 A1* | 4/2010 | Bernstein | 345/174 |
| 2010/0229089 A1 | 9/2010 | Narita | |
| 2010/0295796 A1 | 11/2010 | Roberts et al. | |
| 2011/0050575 A1 | 3/2011 | Krahenbuhl et al. | |
| 2011/0157042 A1 | 6/2011 | Li et al. | |
| 2011/0157085 A1* | 6/2011 | Philipp | 345/174 |
| 2011/0202876 A1 | 8/2011 | Badger et al. | |
| 2012/0326996 A1 | 12/2012 | Cho et al. | |

FOREIGN PATENT DOCUMENTS

| | | |
|---|---|---|
| JP | 2006-040824 A | 2/2006 |
| JP | 2006-139655 | 6/2006 |
| JP | 2010-503125 A | 1/2010 |
| JP | 2010-186254 A | 8/2010 |
| JP | 2010-211407 | 9/2010 |
| KR | 2003-0060338 | 7/2003 |
| KR | 1020110037249 A | 4/2011 |
| WO | WO 2008/030880 A1 | 3/2008 |
| WO | 2011043555 A2 | 4/2011 |

OTHER PUBLICATIONS

Agarwal et al., "High Precision Multi-touch Sensing on Surfaces using Overhead Cameras", ACM, In Proceedings of Tabletop, 2007, 1-4.
Ahsanullah et al., "Investigation of Fingertip Blobs on Optical Multi-touch Screen", International Symposium in Information Technology (ITSim), Jun. 15-17, 2010, 6 pages.
Kim et al., "HCI(Human Computer Interaction) Using Multi-touch Tabletop Display", IEEE Pacific Rim Conference on Communications, Computers and Signal Processing, Aug. 22-24, 2007, 391-394.
Oka et al., "Real-time Tracking of Multiple Fingertips and Gesture Recognition for Augmented Desk Interface Systems", Proceedings of the Fifth IEEE International Conference on Automatic Face and Gesture Recognition (FGR'02), May 20-21, 2002, 6 pages.
Wang et al., "Detecting and Leveraging Finger Orientation for Interaction with Direct-Touch Surfaces", UIST '09 Proceedings of the 22nd annual ACM symposium on User interface software and technology, Oct. 4-7, 2009, 23-32.
"Supplementary Search Report Issued in European Patent Application No. 11870868.4", dated Mar. 9, 2015, 8 Pages.
"Office Action Issued in Korean Patent Application No. 10-2014-7003574", dated Aug. 21, 2017, 9 Pages.
"Fourth Office Action Issued in Chinese Patent Application No. 201180072826.3", dated Aug. 17, 2017, 11 Pages.
"Notice of Allowance issued in Chinese Patent Application No. 201180072826.3", dated Dec. 2, 2016, 6 Pages.
International Patent Application No. PCT/US2011/055619: International Search Report and Written Opinion dated Sep. 27, 2012, 13 pages.
"Office Action Issued in European Patent Application No. 11870868.4", dated Mar. 19, 2018, 4 Pages.

* cited by examiner

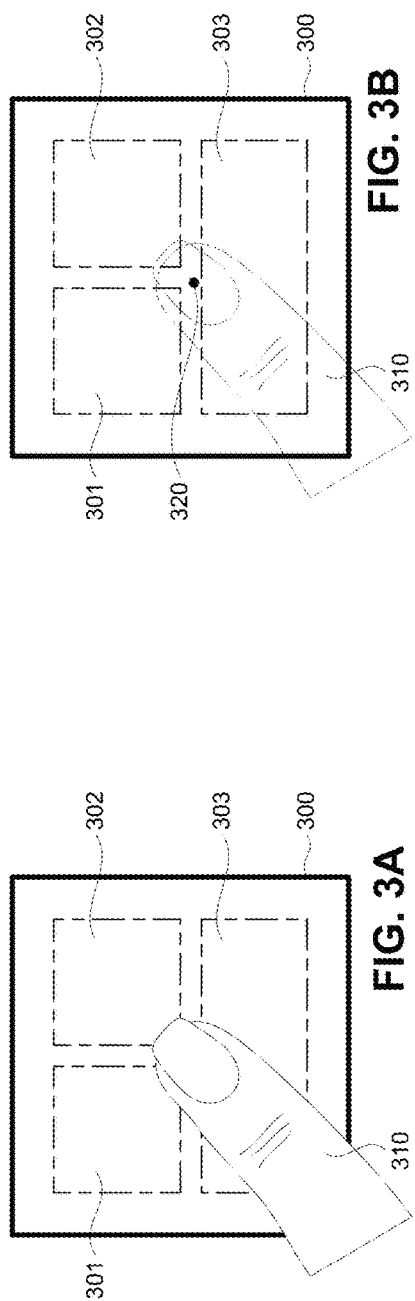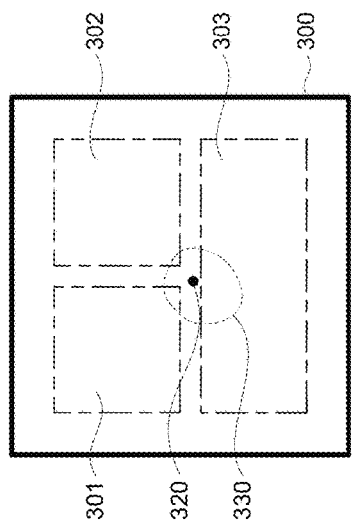

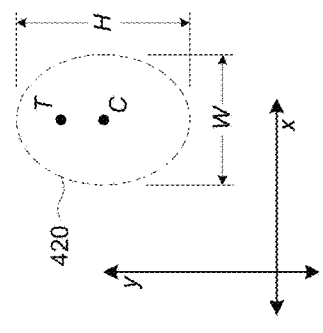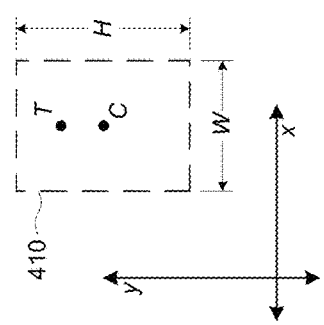

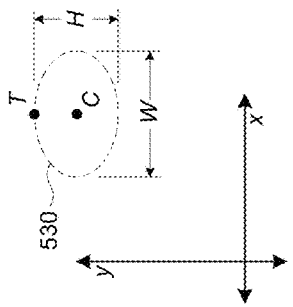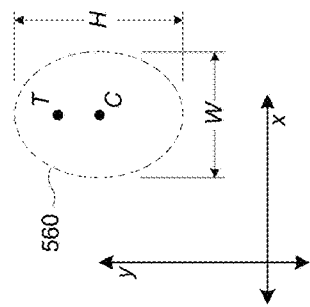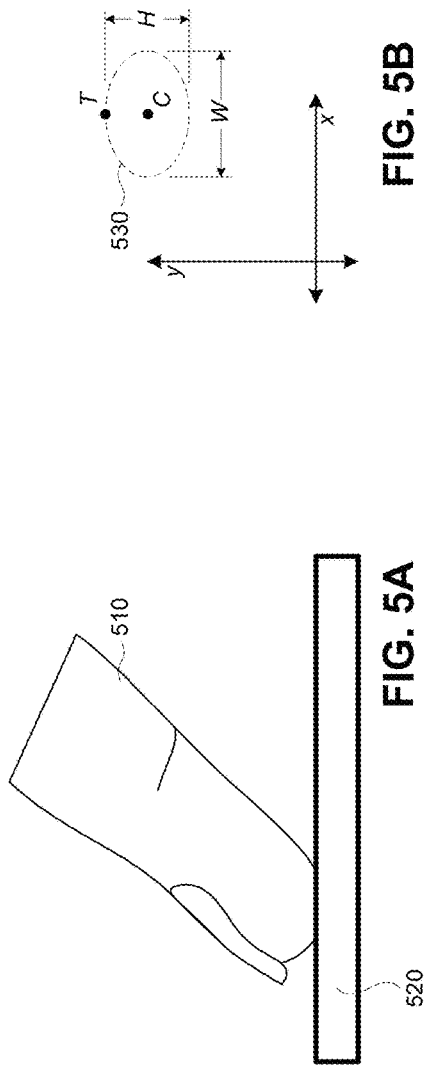
FIG. 5B
FIG. 5D
FIG. 5A
FIG. 5C

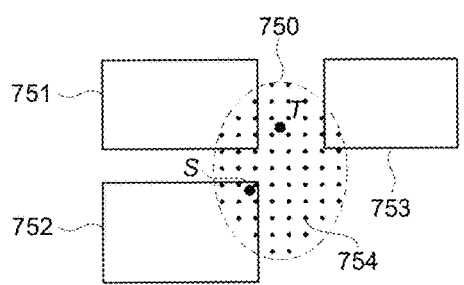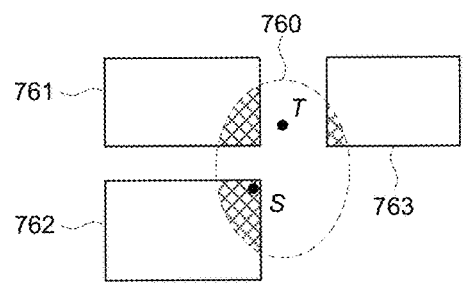
FIG. 7E  FIG. 7F

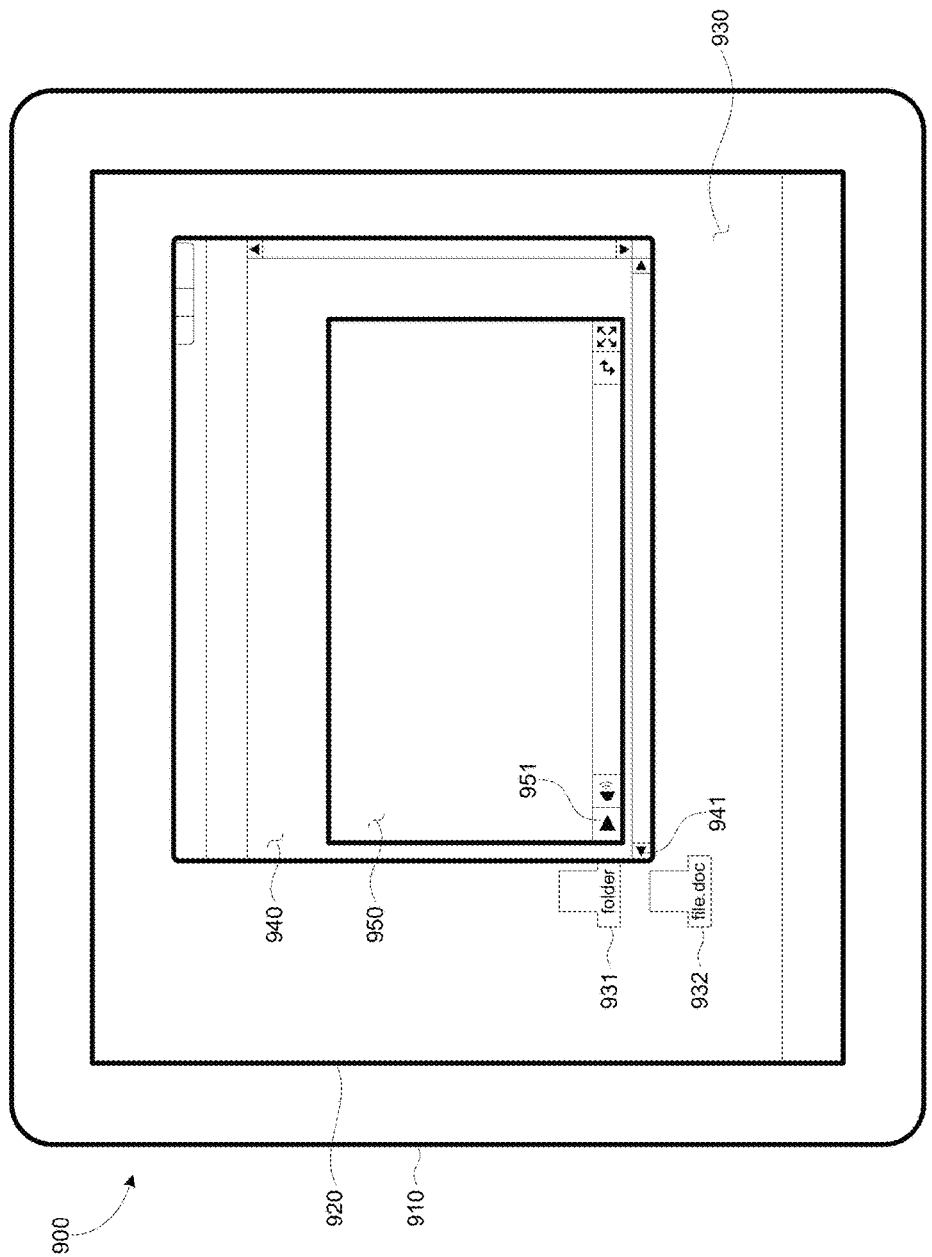

though the finger is much larger than any one point on the touch screen display or the finger might obscure a good view of the element-of-interest enhancing user precision errors.

TOUCH INTELLIGENT TARGETING

BACKGROUND

The subject matter of this application relates to user interaction with displayed user interfaces. Computer systems can include peripheral devices, such as keyboards, monitors, and mice, which allow a user to interact with the computer system and control aspects of user interfaces. Some peripheral devices, such as a mouse, a stylus and the like, allow a user to make precise inputs to control a displayed user interface. However, other devices, such as a touch screen display, a touch pad, a motion-sensitive camera, and the like, are more accessible to users in certain instances but user inputs are much less precise. Touch screen displays, touch pads, and similar user input devices can be included in any number of devices, such as monitors, laptop computers, table computers, cellular telephones, point-of-sale kiosks, and the like.

A problem with various implementations of touch screens, touch pads, and motion-sensitive cameras devices is how to determine what object a user intends to target. When a mouse is used to control a user interface, the mouse pointer indicates a particular point on a screen. The point indicated by the mouse pointer is much more precise than a user's finger is on a touch screen. However, using a mouse is not desirable or feasible with certain devices, such as cellular telephones, tablet computers, and the like. In contrast to a mouse, a touch screen display is much less precise. When a user touches a touch screen display, it may not be clear what point the user is intending to target because the user's finger is much larger than any one point on the touch screen display or the finger might obscure a good view of the element-of-interest enhancing user precision errors.

SUMMARY

The inventions disclosed herein are directed to determining targeted point based on objects shown on a display. In one embodiment, a method of determining a targeted point based on objects shown on a display includes receiving an indication of a first point an indication of a width, and an indication of a height, estimating a portion of the display based on the indication of the first point, the indication of the width, and the indication of the height, determining that at least a portion of one or more objects is located within the estimated portion of the display, and determining a targeted object from the one or more objects based on a location of the first point and based on the portion of the one or more objects within the estimated portion of the display. The user input can be a touch of a touch screen display, a touch of a touch pad device, a gesture sensed by a motion-sensitive camera, or other user input device.

In another embodiment, a system includes a display device configured to display one or more objects, and a computing device configured to receive an indication of a first point, an indication of a second point, an indication of a width, and an indication of a height, estimate a portion of the display based on the indication of the second point, the indication of the width, and the indication of the height, determine that at least a portion of one or more objects is located within the estimated portion of the display, and determine a targeted object from the one or more objects based on a location of the first point and based on the portion of the one or more objects within the estimated portion of the display. In yet another embodiment, a computer readable medium embodies instructions which include instructions to receive an indication of a first point, an indication of a second point, an indication of a width, and an indication of a height, instructions to estimate a portion of the display based on the indication of the second point, the indication of the width, and the indication of the height, instructions to determine that at least a portion of one or more objects is located within the estimated portion of the display, and instructions to determine a targeted object from the one or more objects based on a location of the first point and based on the portion of the one or more objects within the estimated portion of the display.

BRIEF DESCRIPTION OF THE DRAWINGS

FIGS. 3A-3C depict an example embodiment of a touch screen display and an example user interaction with the touch screen display.

FIGS. 4A-4D depict embodiments of data provided by a touch screen display and embodiments of estimating contact areas between user fingers and a touch screen display.

FIGS. 5A-5D depict example user interactions with touch screen displays and embodiments of estimating contact areas between a user and a touch screen display.

FIGS. 7A-7F depict various embodiments of determining targeted points.

FIGS. 9A-9B depict an embodiment of a touch screen display which depicts multiple frameworks and embodiments of determining a targeted point when an estimated contact area between a user and a touch screen display when the estimated portion of the display spans portions of multiple frameworks.

DETAILED DESCRIPTION OF ILLUSTRATIVE EMBODIMENTS

Figure 1:
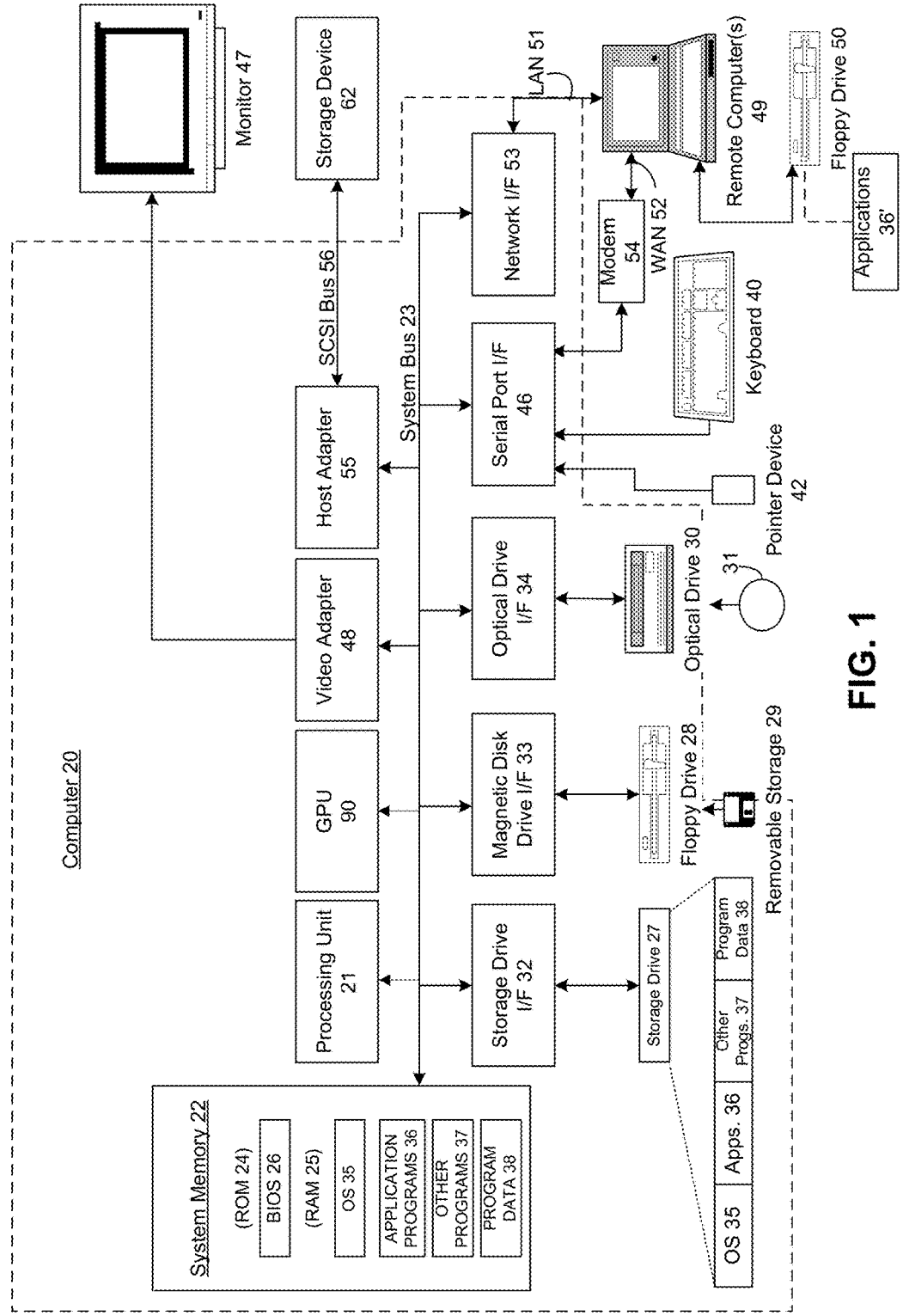
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein depicts storage media such as a hard disk, a removable magnetic disk 29 and a removable optical disk 31, it should be appreciated by those skilled in the art that those storage media may not be present or needed in various embodiments. Moreover, other types of computer readable media may be employed that can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and a pointer device 42. The pointer device 42 can be a mouse, a touch pad, a touch screen, a camera that senses user movements, and so on. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figures 2A, 2B:
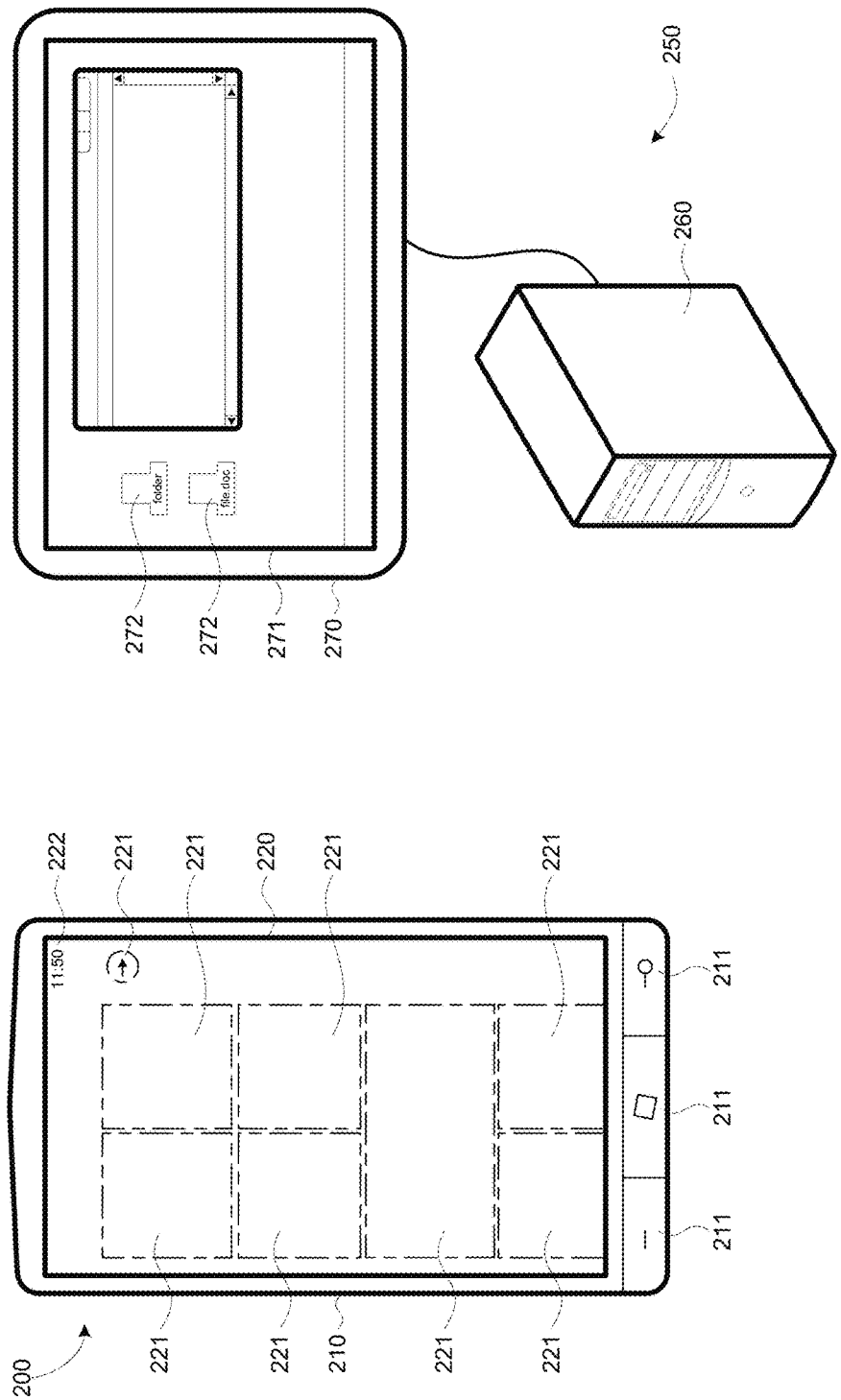
FIGS. 2A-2B depict example embodiments of computing devices and touch screen displays.

Referring now to FIG. 2A, depicted is an embodiment of a mobile computing device 200. Mobile computing device 200 can be a cellular telephone, personal data assistant or other similar device. The mobile computing device 200 can include a computing device (not shown) within housing 210. The computing device in mobile device 200 is similar to the computer 20 described with respect to FIG. 1, and can include some or all of the components of computer 20, such as processing unit 21, system memory 22, storage drive 27, and so on. Housing 210 can include multiple buttons 211. The mobile computing device 200 can also include a touch screen display 220. The touch screen display 220 is an embodiment of a pointer device, similar to the pointer device 42 described above with respect to FIG. 1. The touch screen display 220 can display both interactable objects 221 and non-interactable objects 222. A user can touch the touch screen display 220 to indicate a desired action to be performed, such as selecting one of the objects 221. Touch screen display 220 can be a capacitive touch screen display or a resistive touch screen display.

Referring now to FIG. 2B, depicted is an embodiment of a system 200. System 200 includes a computer 260 and a monitor 270. The computer 260 is similar to the computer 20 described with respect to FIG. 1, and can include some or all of the components of computer 20, such as processing unit 21, system memory 22, storage drive 27, and so on. The monitor 270 can also include a touch screen display 271. The touch screen display 271 is an embodiment of a pointer device, similar to the pointer device 42 described above with respect to FIG. 1. The touch screen display 271 can display both objects 272. A user can touch the touch screen display 272 to indicate a desired action to be performed, such as selecting one of the objects 272.

Referring now to FIG. 3A, depicted is an embodiment of a touch screen display 300 which is displaying three objects 301, 302, and 303. In the embodiment shown in FIG. 3A, a user touches the touch screen display 300 with a finger 310. The depiction in FIG. 3A shows one of the difficulties for users that use touch screen displays. As the user attempts touch the touch screen display 300, the user's finger 310 obscures the portion of the touch screen display 300 that is going to be touched. Because the user's view of the touch screen display is obscured, the user does not know exactly what portion of the touch screen display 300 is actually touched.

Referring now to FIG. 3B, depicted is a view of the touch screen display 300 and the user's finger 310 with the user's finger 310 being shown as transparent. When the user touches the touch screen display 300, the touch screen display 300 determines a touch point 320. The touch point 320 is the point at which the touch screen display 300 interprets the user to have targeted by touching the touch screen display 300. The touch screen display 300 can send an indication of the touch point 320 to a computing device when the user touches the touch screen display 300. The indication of the touch point 320 can take the form of Cartesian coordinates (x, y), polar coordinates (r, θ), or any other form of information which specifies a point on a two-dimensional plane.

Referring now to FIG. 3C, depicted is a view of the touch screen display 300 showing the objects 301, 302, and 303 and touch point 320. Also depicted is an outline of the actual contact area 330 where the user's finger 310 actually contacted the touch screen display 300. The contact area between a user and a touch screen display can cover portions of multiple objects. In the example depicted in FIG. 3C, the actual contact area 330 covers portions of each of objects 301, 302, and 303. However, the touch point 320 determined by the touch screen display 300 is not located over any of the objects 301, 302, and 303. Thus, in the example depicted in FIGS. 3A-3C, even though the user's finger 310 actually touched the touch screen display 300 over portions of each of three objects 301, 302, and 303, touch point 320 is not actually located on any object. A computing device can interpret the touch point as the point that was targeted by the user when making contact with the touch screen display. In such a situation, a computing device would not interpret the user's touch of touch screen display 300 as targeting any of objects 301, 302, and 303 because the touch point 320 is at a location that is not over any of objects 301, 302, and 303.

As described with respect to FIGS. 3A-3C, a touch screen display can detect a user's touch of the touch screen display and can determine a touch point based on that user's touch. The touch screen display can provide a computing device with indications of the touch point in the form of Cartesian coordinates (x, y). FIG. 4A depicts the information available to the computing device when the touch screen display does not provide the computing device with any information beyond an indication of the touch point T. As depicted, when the touch screen display does not send the computing device any information beyond an indication of the touch point T, the computing device does not know any more about the user's touch of the touch screen display other than the location of the touch point T on a Cartesian plane.

FIG. 4B depicts another embodiment of data that can be provided by a touch screen display. In addition to providing an indication of the touch point T, a touch screen display can also provide an indication of a center point C. The center point C can be an approximation of the point that is in the center of the contact area between the touch screen display and the user's finger. In contrast, the touch point T is a point selected by the touch screen device as an estimate of the point that the user intended to target. The center point C and the touch point T can be different locations, as depicted in FIG. 4B, or they can be the same location. In an embodiment, the location of touch point T can be determined based on the location of center point C and a fixed offset. For example, the location of touch point T can be determined as the location which is two millimeters above the location of the center point C.

FIG. 4C depicts another embodiment of data that can be provided by a touch screen display and an embodiment of estimating a portion of a display based on contact between a user and a touch screen display. In the embodiment depicted in FIG. 4C, the touch screen display provides the computing device with an indication of a touch point T, an indication of a center point C, an indication of a height H, and an indication of a width W. The touch point T and the center point C can be similar to those points described with respect to FIGS. 4A and 4B. The width can be the horizontal distance between the leftmost point at which the user touches the touch screen display and the rightmost point at which the user touches the touch screen display. Similarly, the height can be the vertical distance between the uppermost point at which the user touches the touch screen display and the lowermost point at which the user touches the touch screen display. A computing device can estimate a portion of a display 410 between the user's finger and the touch screen display based on an indication of a center point C, an indication of a height H, and an indication of a width W. In the embodiment depicted in FIG. 4C, the estimated portion of the display 410 is a rectangle centered about center point C with a width W and a height H. While the rectangular shape of estimated portion of the display 410 is likely not the exact shape of the contact area between the user's finger and the touch screen display, it is an estimation of the actual contact area which can be used to determine a targeted object, as discussed in further detail below. While the estimated portion of the display 410 can be centered about the center point C, as depicted in FIG. 4C, it is also possible for the estimated portion of the display 410 to be centered about touch point T. In the latter case, it is possible for the computing device to determine the estimated portion of the display based on an indication of the touch point T, an indication of the height H, and an indication of the width W.

FIG. 4D depicts another embodiment of estimating a portion of a display. The touch screen display provides the computing device with an indication of a touch point T, an indication of a center point C, an indication of a height H, and an indication of a width W. In this embodiment, the computing device estimates a portion of a display 420 that is an ellipse centered about center point C with a width W and a height H. An elliptical shape of estimated portion of the display 420 may be a closer approximation of the actual contact area between the user's finger and the touch screen display than the rectangular approximation in FIG. 4C. However, the elliptical estimated portion of the display 420 is still an approximation of the actual contact area between the user's finger and the touch screen display. Other shapes, beyond the rectangle depicted in FIG. 4C and the ellipse depicted in FIG. 4D may be used to estimate a portion of a display or to estimate the contact area between the user's finger and the touch screen display.

Referring now to FIGS. 5A-5D, depicted are two instances of contact between a user's finger and a touch screen display, and the corresponding estimations of a portion of a display by a computing device. In FIG. 5A, a user's finger 510 contacts a touch screen display 520 near the tip of the user's finger 510. Under circumstances such as this embodiment, it is possible for the contact area between the user's finger 510 and touch screen display 520 to be wider than it is tall. FIG. 5B depicts a computing device's estimation of a portion of a display 530 between a user's finger 510 and touch screen display 520. The computing device can receive an indication of a touch point T, an indication of a center point C, an indication of a height H, and an indication of a width W from touch screen display 520. Because the contact area between the user's finger 510 and touch screen display 520 is wider than it is tall, the value of H is greater than the value of W. Because the value of H is greater than the value of W, computing device can estimate an elliptical portions of the display 530 which is wider than it is tall.

In FIG. 5C, a user's finger 540 contacts a touch screen display 550 closer to the pad of the user's finger 540. Under these circumstances, it is possible for the contact area between the user's finger 540 and touch screen display 550 to be taller than it is wide. FIG. 5D depicts a computing device's estimation of a portion of a display between the user's finger 540 and touch screen display 550 depicted in FIG. 5C. The computing device can receive an indication of a touch point T, an indication of a center point C, an indication of a height H, and an indication of a width W from touch screen display 550. Because the contact area between the user's finger 540 and touch screen display 550 is taller than it is wide, the value of W is greater than the value of H. Because the value of W is greater than the value of H, computing device can estimate an elliptical portion of the display 560 which is taller than it is wide.

While embodiments of the present inventions have been described with respect to a touch screen display, other embodiments of the present invention are possible. In one embodiment, a user could interact with a touch pad device to provide input for controlling a displayed user interface. The touch pad could send to the computing device an indication of a point, an indication of a width, and an indication of a height based on the user's touch of the touch pad. The computing device can estimate a portion of the displayed user interface based on the indication of the point, the indication of the width, and the indication of the height. In another embodiment, a user could interact with a motion-sensitive camera to control a user interface displayed on a television. The motion-sensitive camera could send to the computing device an indication of a point, an indication of a width, and an indication of a height based on a user's location, motion, or gesture. The computing device could estimate a portion of the user interface displayed on the television based on the indication of the point, the indication of the width, and the indication of the height. In another embodiment, the user could interact with a touch screen display using a capacitive pen. The touch screen display could send to the computing device an indication of a point, an indication of a width, and an indication of a height based on the capacitive pen's touch of the touch pad.

FIGS. 6A-6D depict further embodiments of the data which a touch screen display can provide to a computing device, and embodiments of estimating a portion of the display. In these embodiments, the computing device can receive an indication of a touch point T, an indication of a center point C, an indication of a height H, an indication of a width W, and an indication of an angle θ from touch screen display. The angle θ represents an approximation of an angle at which the user's finger contacted the touch screen with respect to one of the directions in the Cartesian plane. In the embodiments depicted in FIGS. 6A-6B, the angle θ represents an approximation of an angle at which the user's finger contacted the touch screen with respect to the y-axis. However, one of ordinary skill in the art would recognize that the angle θ could be the angle of the user's finger with respect to any axis or line in the Cartesian plane.

Figure 6A:
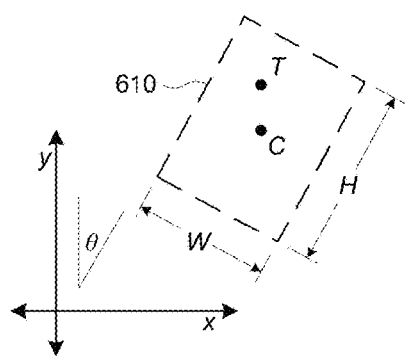
FIGS. 6A-6D depict additional embodiments of data provided by a touch screen display and embodiments of estimating a portion of the display.
Figure 6B:
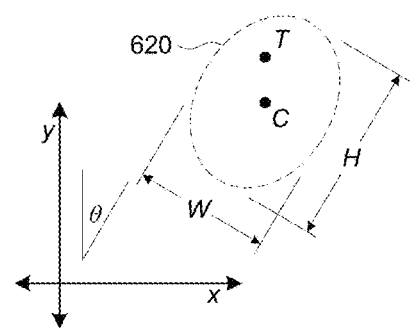

In FIG. 6A, the computing device estimated a portion of a display 610 as a rectangle having a width W and a height H. The rectangular estimated portion of the display 610 is centered about the center point C and is rotated about the center point C by the angle θ. In FIG. 6B, the computing device estimated that the portion of the display 620 is an ellipse having a width W and a height H. The elliptical portion of the display 620 is centered about the center point C and is rotated about the center point C by the angle θ. As is depicted in both FIGS. 6A and 6B, the touch point T does not need to be rotated about the center point C by the angle θ.

Figure 6C:
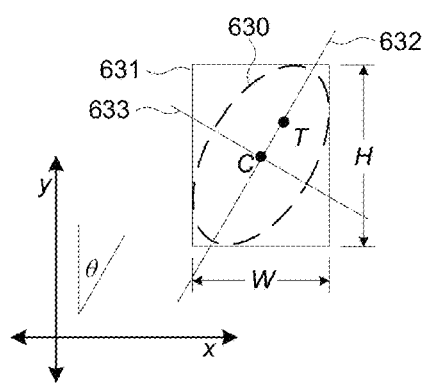
Figure 6D:
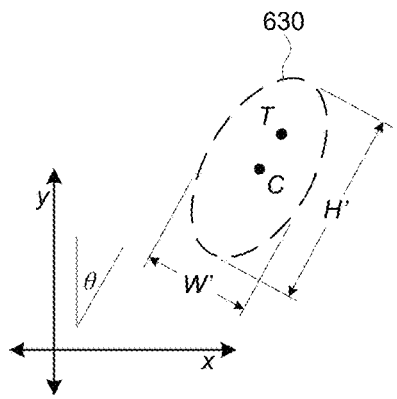

In FIG. 6C, the computing device estimated that the portion of the display 630 is an ellipse that is inscribed within a rectangle 631. The rectangle 631 has a width W and a height H and is centered about center point C. The long edge of rectangle 631 is parallel to the y-axis. Elliptical portion of the display 630 has a long axis 632 which is located at an angle θ with respect to the y-axis and a short axis 633 which is perpendicular to the long axis 632. As is depicted in FIG. 6C, the touch point T can be rotated about the center point C by the angle θ. FIG. 6D depicts the elliptical portion of the display 630 which is depicted in FIG. 6C. As depicted in FIG. 6D, the elliptical portion of the display 630 has width W' and a height H' which are different from the width W and the height H of rectangle 631. Inscribing an estimated portion of a display inside of rectangle 631 is not limited to elliptical estimated portions of a display. It is also possible for a computing device to estimate a rectangular portion of a display inscribed within rectangle 631 or any other shape for an estimated portion of a display.

In other embodiments, it is possible for a computing device to estimate a portion of the display in other ways. In one embodiment, the computing device can simply estimate a width and a height of a contact area between a user and a display to estimate a portion of the display. In another embodiment, the computing device can average heights and widths of previous indications of heights and widths, and use those average heights and widths to estimate a portion of the display.

Figure 7A:
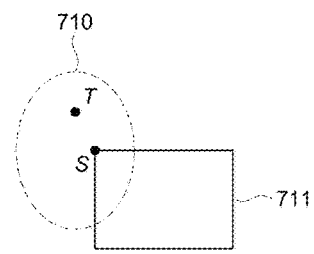

Referring now to FIGS. 7A-7F, depicted are various embodiments of determining a targeted point. FIG. 7A depicts a determination of a targeted point by finding an intersection between an object and an estimated portion of a display. As depicted, a portion of object 711 intersects estimated portion of a display 710, but touch point T is not located on object 711. Even though touch point T is not located on object 711, the computing device can determine that the targeted point S is located on object 711 because object 711 is the only object which intersects the estimated portion of a display 710. The targeted point S, also referred to as a snap point, represents a location on the targeted object 711 that is targeted by the user's touch of the touch screen display.

Figure 7B:
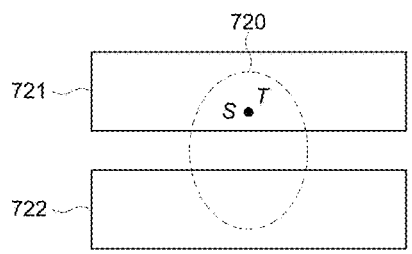

FIG. 7B depicts a determination of a targeted point by finding that a touch point is included within an object. As depicted, a portion of object 721 and a portion of object 722 intersect estimated portion of a display 720. Touch point T is located on object 721. The computing device can determine that the targeted point S is located at the same location as the touch point T because object 721 is the only object which includes the touch point T.

Figure 7C:
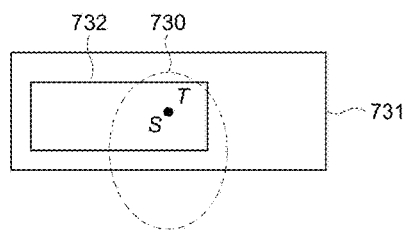

FIG. 7C depicts a determination of a targeted point and a targeted object by using ranks associated with objects. As depicted, a portion of object 731 and a portion of object 732 intersect estimated portion of a display 730. Object 732 also overlaps object 731 and touch point T is located on both of objects 731 and 732. Because touch point T is located on both of objects 731 and 732, the targeted location S can be determined to be at the location of touch point T. A rank can be associated with each of objects 731 and 732. When objects overlap and when the targeted location S is located on overlapping objects, such as the objects 731 and 732 depicted in FIG. 7C, the computing device can determine which of objects 731 and 732 is the targeted object based on the rank of each of objects 731 and 732. The ranks of objects 731 and 732 can be based on the geometry of objects 731 and 732, based on a likelihood that a user would select each of objects 731 and 732, or any other form of rankings. The ranks of objects 731 and 732 can also be provided by operating systems, applications, or other components operating on the computing system.

Figure 7D:
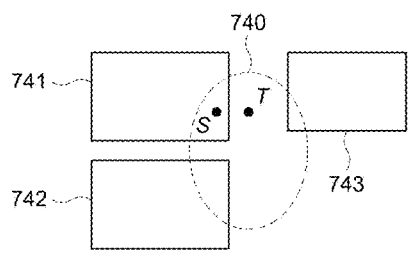

FIG. 7D depicts a determination of a targeted point when the touch point is ambiguous. A touch point is ambiguous when the touch point is not located over an object, but multiple objects are at least partially located within the estimated portion of a display. As depicted in FIG. 7D, portions of each of objects 741, 742, and 743 are located within estimated portion of a display 740. However, touch point T is not located over any of objects 741, 742, and 743. To resolve the ambiguity of which location is the targeted point, the computing device can determine the distance between the touch point T and each of objects 741, 742, and 743. The computing device may make the determination solely based on the distances, or the computing device may weight those distances. The distances can be weighted by one or more of a rank associated with each of objects 741, 742, and 743, a shape of each of objects 741, 742, and 743, the portion of each of objects 741, 742, and 743 located in the estimated portion of a display 740, and the like. In the embodiment depicted in FIG. 7D, the computing device determined that the targeted point S is located on object 741. The determination of the targeted point S can be based on the distance between touch point T and object 741 being shorter that either of the distances between touch point T and objects 742 and 743.

FIG. 7E depicts a determination of a targeted point using a shotgun approach to resolve an ambiguous touch point. In the embodiment depicted in FIG. 7E, portions of each of objects 751, 752, and 753 are located within estimated portion of a display 750; however, touch point T is not located over any of objects 751, 752, and 753. The computing device can use a number of points 754 within the estimated portion of a display 750 and determine number of points 754 which are located within objects 751, 752, and 753. In the embodiment depicted in FIG. 7E, more of points 754 are located within object 752 than within either of objects 751 and 753. Based on the location of the points 754, the computing device can determine a targeted point S which, in this embodiment, is located on object 752.

FIG. 7F depicts a determination of a targeted point using an object overlap approach to resolve an ambiguous touch point. In the embodiment depicted in FIG. 7F, portions of each of objects 761, 762, and 763 are located within estimated portion of a display 760; however, touch point T is not located over any of objects 761, 762, and 763. The computing device can determine the size of the portion of each of objects 761, 762, and 763 that is located within the estimated portion of a display 760. In the embodiment depicted in FIG. 7F, more of object 762 is located within the estimated portion of a display 760 that the portions of objects 761 and 763 that are located within the estimated portion of a display 760. Based on the portions of objects 761, 762, and 763 that are located within the estimated portion of a display 760, the computing device can determine a targeted point S which, in this embodiment, is located on object 762.

Figure 8A:
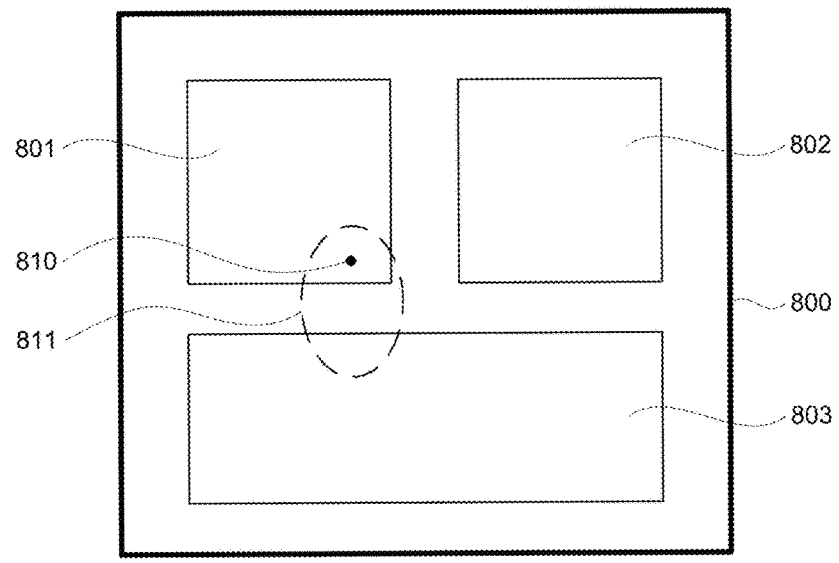
FIGS. 8A-8D depict additional embodiments of determining targeted points.

Referring now to FIGS. 8A-8D, depicted is an embodiment of a touch screen display and embodiments of determinations of a targeted points. Depicted in FIG. 8A is a touch screen display 800 which is displaying three objects 801, 802, and 803. In response to a user's touch of touch screen display 800, touch screen display sends to a computing device an indication of a point 810, an indication of a width, and an indication of a height. The point 810 can be a touch point or a center point. The touch screen display 800 can be part of a peripheral device of the computing device, such as a monitor, or the touch screen display can be integrally formed with the computing device, such as the case of a cellular telephone or a tablet computer. After the computing device receives the indication of the point 810, the indication of a width, and the indication of a height, the computing device can estimate a portion of a display 811 of contact between the user and the touch screen display 800.

Figure 8B:
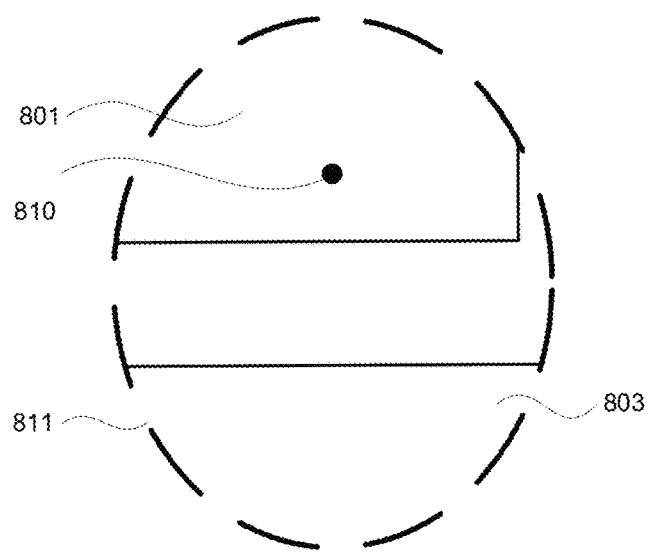

FIG. 8B depicts the estimated portion of a display 811 based on contact between the user and the touch screen display 800 along with the portions of objects 801 and 803 located within the estimated portion of a display 811 and the point 810. The point 810 is located over object 801. Because the point 810 is located over one object 801, the computing device can determine that the targeted point is located at the same location as the point 810.

Figure 8C:
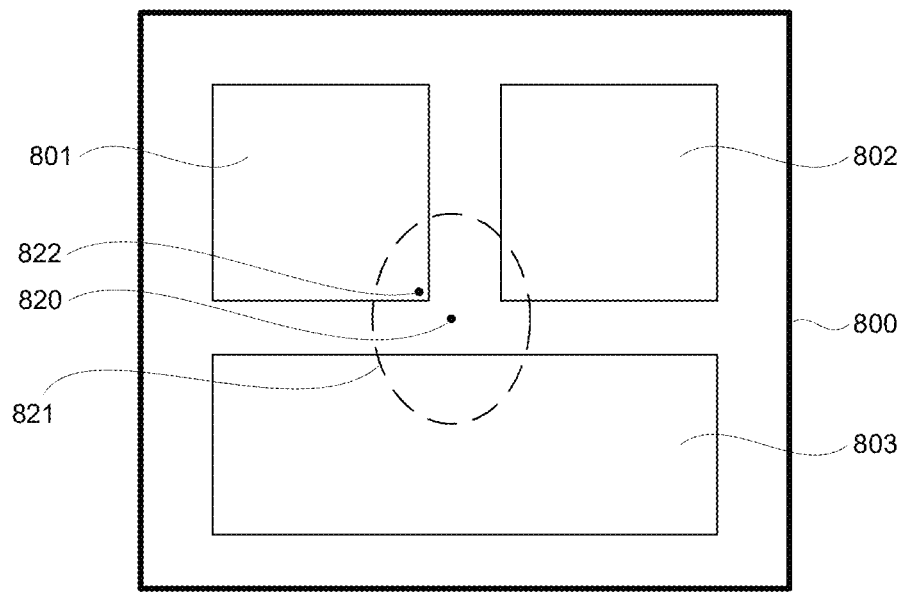

FIG. 8C depicts a determination of a targeted point based on an ambiguous point. As depicted in FIG. 8C, point 820 is ambiguous because at least a portion of multiple objects 801, 802, and 803 are contained within estimated portion of a display 821, but touch point 820 is not located on any of objects 801, 802, and 803. The computing device can determine a location of a targeted point 822 based on a distance between the point 820 and each portion of objects 801, 802, and 803. In the embodiment depicted in FIG. 8C, touch point 820 is located closer to object 801 than it is to either of objects 802 and 803. In the embodiment depicted here, a computing device determines that targeted point 822 located over object 801 because the shortest distance between object 801 and the point 820 is shorter than the shortest distances between the point 820 and the objects 802 and 803.

In another embodiment, the computing device weight each of the distances between touch point 810 and each of objects 801, 802, and 803. The weights can be based on the features of objects 801, 802, and 803 within estimated portion of a display 821. For example, touch point T is located nearest to corners of objects 801 and 802, and touch point T is located nearest to a side of object 803. The computing device can give greater weight to the distance between point 820 and object 803 if it is determined that a user is more likely to select the long edge of an object than the corner of an object. Similarly, computing device can give greater weight to the distances between point 820 and the objects 801 and 802 if it is determined that a user is more likely to select the corner of an object than the long edge of an object. The weights can also be based on the likelihood that a user will select certain objects. For example, a user may be much more likely to select object 802 than objects 801 or 803. In this case, the computing device may give greater weight to the distance between point 820 and object 802 than to distances between point 820 and the objects 801 and 803. The weights can also be based on the portion of each object which is located within estimated portion of a display 811. For example, as depicted in FIG. 8C, object 803 takes up nearly one half of estimated portion of a display 812 while objects 801 and 802 take up much smaller portions of estimated portion of a display 812. In this case, the computing device may give greater weight to the distance between point 820 and object 803 than to distances between point 820 and objects 801 and 802.

Figure 8D:
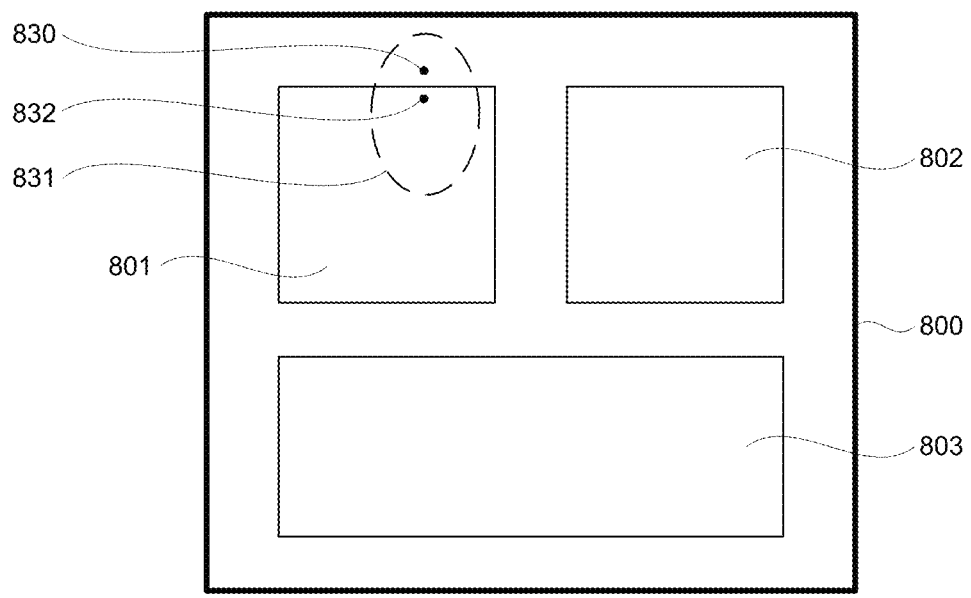

Depicted in FIG. 8D is another embodiment of touch screen display 800. In this embodiment, touch screen display 800 is depicted as displaying three objects 801, 802, and 803. Also depicted are point 830 and estimated portion of a display 831. Point 830 is not located over any of objects 801, 802, and 803. However, a portion of object 801 intersects the estimated portion of a display 831. In one embodiment, the computing device determines that targeted point 832 is located over object 801 because object 801 intersects estimated portion of a display 831 and object 801 is the only object that is partially located within estimated portion of a display 831.

Referring now to FIG. 9A, depicted is a device 900 which includes a housing 910 and a touch screen display 920. Device 900 can be a display device, such as a monitor, which connects to a computing device. Device 900 can also include a computing device within housing 910, such as a cellular telephone or a tablet computer. As depicted in FIG. 9A, touch screen display 920 displays an operating system 930, a web browser 940, and a media player 950 which is embedded within a web page displayed by web browser 940. Each of operating system 930, web browser 940, and media player 950 is a separate framework. Each framework can include objects. For example, in the embodiment depicted in FIG. 9A, operating system 930 includes icons 931 and 932, web browser 940 includes a button 941, and media player 950 includes a button 951.

As described above, a computing device can determine which of many objects is a targeted object based on a likelihood that the objects will be targeted. In one embodiment, each framework can provide the computing system with a rank for some or all of the objects within the framework. For example, operating system 930 can provide a rank for icon 931 and a rank for icon 932, web browser 940 can provide a rank for button 941, and media player 950 can provide a rank for button 951. It is also possible for some frameworks to provide ranks for objects, while other frameworks do not provide ranks for objects. For example, in one embodiment, operating system 930 and web browser 940 provide ranks for each of their objects, while media player 950 does not provide ranks for any of its objects.

Figure 9B:
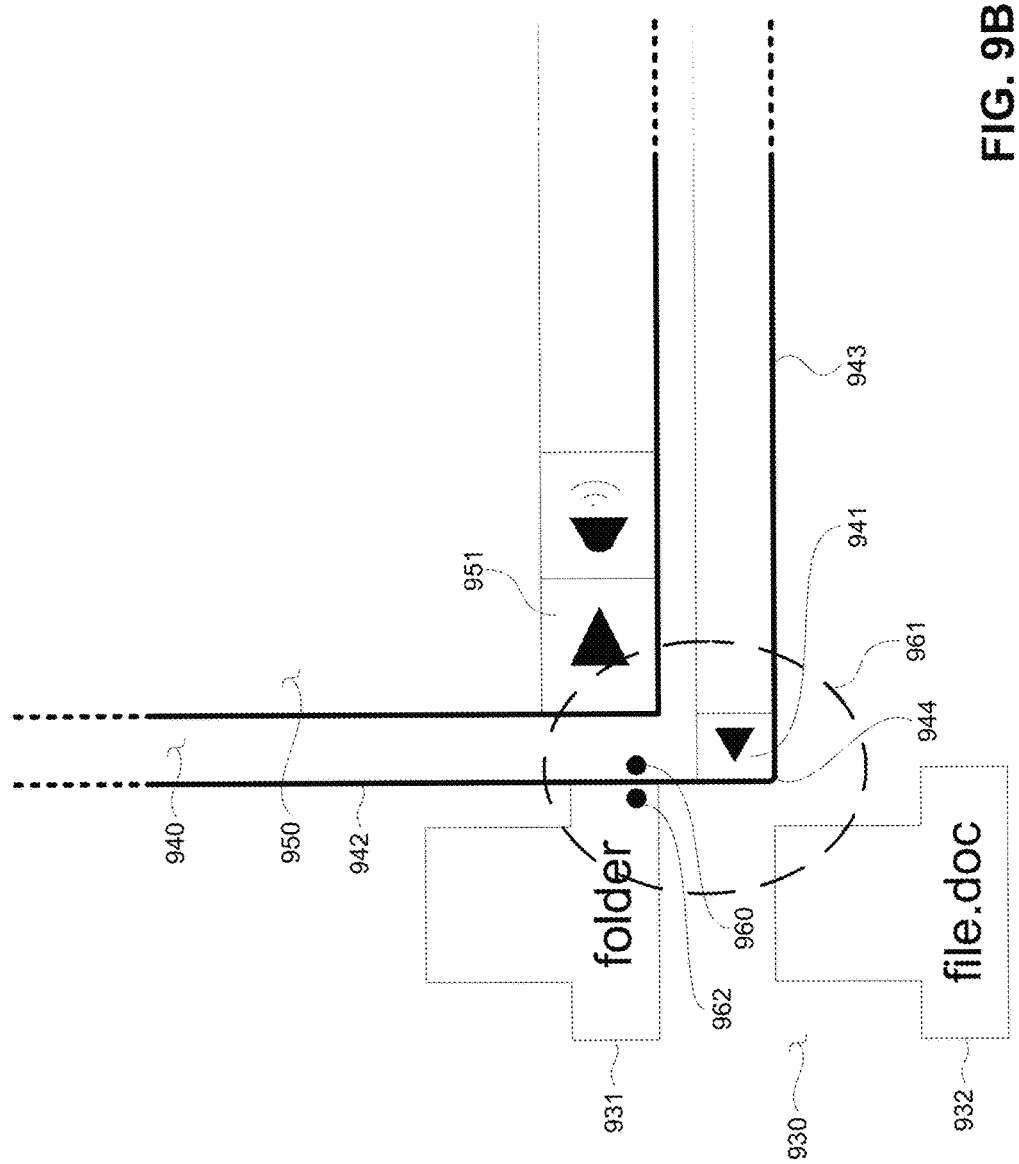

Referring now to FIG. 9B, depicted is a portion of the touch screen display depicted in FIG. 9A. Also depicted in FIG. 9B is a touch point 960 and an estimated portion of a display 961. As described above, the estimated portion of a display 961 can be determined by a computing device based on an indication of a point, an indication of a width, and an indication of a height received from the touch screen display 920. As depicted, portions of a number of objects are located within the estimated portion of a display 961, including portions of icon 931 and icon 932 of operating system 930, portions of button 941, vertical edge 942, horizontal edge 943, and corner 944 of web browser 940, and a portion of button 951 of media player 950.

The computing device can determine a location of a targeted point 962 within estimated portion of a display 961 based on the location of the portions of the objects within estimated portion of a display 961. For example, the computing device could determine that the targeted point 962 is located over the closest object to touch point 960. However, a distance-based determination can be problematic in certain situations. As depicted in FIG. 9B, vertical edge 942 overlaps icon 931 such that vertical edge 942 and icon 931 are substantially equidistant from touch point 960. One way to address such issues is to weight the distances between the touch point and each object according to a rank associated with each object. As discussed above, each framework may provide a rank for objects to the computing system. Where a framework does not provide a rank for an object, a rank can be assigned to the object. Assigning a rank to unranked objects ensures that each object will have a rank associated with it for use with rank-based determinations of targeted objects. As shown in the embodiment depicted in FIG. 9B, the targeted point 962 is located over icon 932.

Figure 10A:
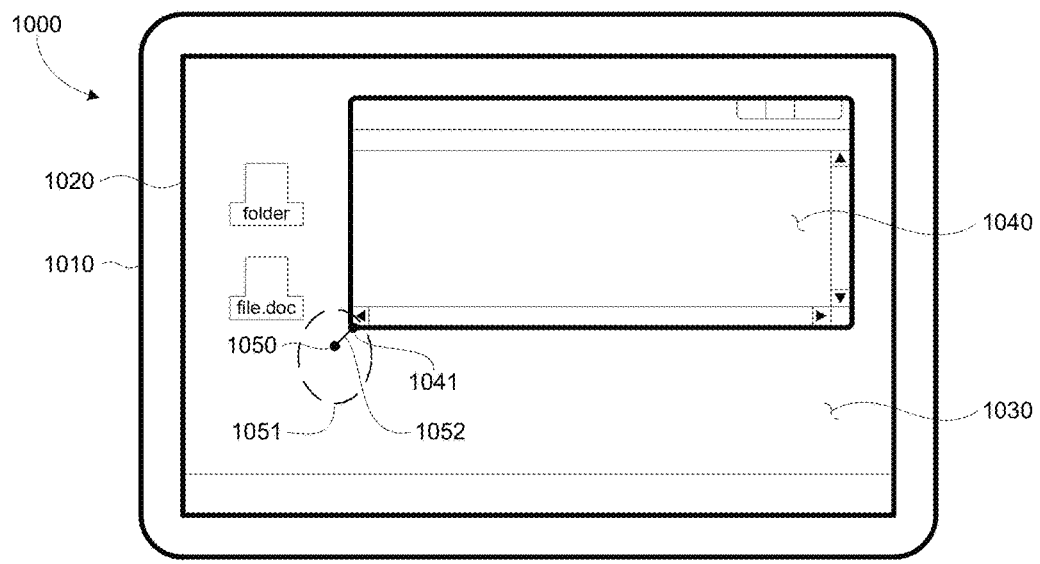
FIGS. 10A-10B depict an embodiment of a user touching a touch screen display and moving the point of contact between the user and the touch screen while maintaining contact with the touch screen display.
Figure 10B:
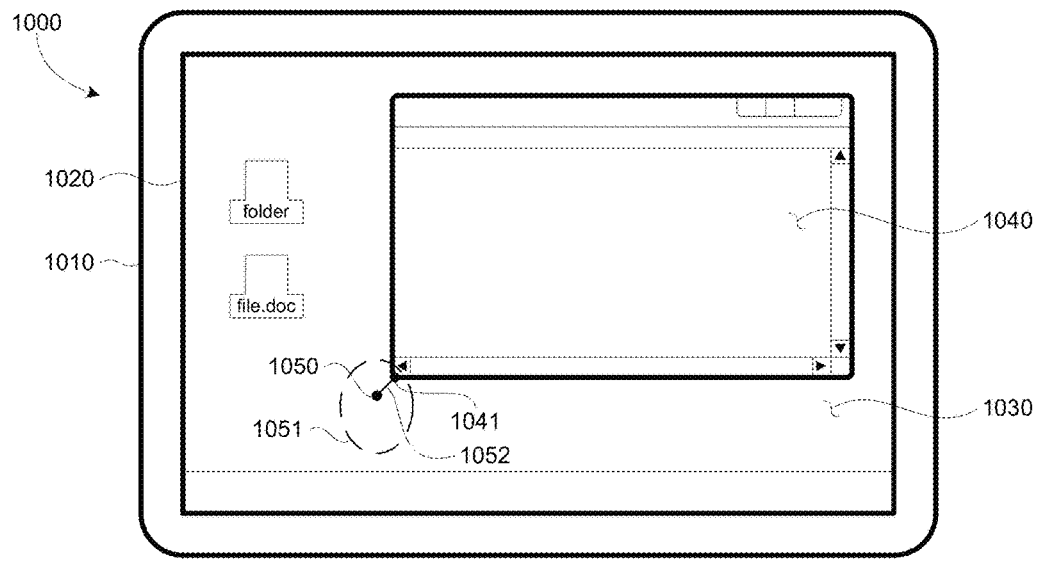

Referring now to FIGS. 10A and 10B, depicted are two instances of a device 1000 and an embodiment of a user touching a touch screen display and moving the point of contact between the user and the touch screen while maintaining contact with the touch screen display. The device 1000 can include a housing 1010 and a touch screen display 1020. The touch screen display 1020 displays an operating system 1030 and a web browser 1040. The corner 1041 of web browser 1040 is an object which, upon selection, allows a user to resize the web browser 1040 by dragging the user's figure from one location to another. Also depicted in FIGS. 10A and 10B are a touch point 1050 and an estimated portion of a display 1051. FIG. 10A depicts a point in time when a user touches the touch screen display 1020, and FIG. 10B depicts a later point in time. Between the time depicted in FIG. 10A and the time depicted in FIG. 10B, the user's finger was dragged across touch screen display 1020 to resize web browser 1040. At the time depicted in FIG. 10A, the computing device can determine that the corner 1041 of the web browser is the targeted point is located on corner 1041 even though the touch point is not located on the corner 1041. The difference in locations of the touch point and the targeted point is represented by offset 1052. As depicted In FIG. 10B, the offset 1052 is maintained as the user's finger is dragged across the touch screen display 1020. In one embodiment, the offset 1052 between a touch point 1050 and a targeted point 1041 is determined at the time depicted in FIG. 10A when a user contacts a touch screen display. As the user moves point of contact between the user and the touch screen, such as when the user drags a finger across the touch screen, the offset is maintained so long as the user remains in contact with the touch screen display.

As mentioned above, one embodiment of the present inventions includes a user interacting with a motion-sensitive camera to control a user interface displayed on a television. In such an embodiment, the motion-sensitive camera can recognize user inputs based on a user's location or a user's actions. From the user inputs, the motion-sensitive camera can determine an targeted point, a center point of the user interaction, a width of the user interaction, and a height of the user interaction. The motion-sensitive camera can send an indication of the targeted point, an indication of the center point, an indication of the width, and an indication of the height to a computing device. The computing device can determine a target object based on the received indication of the targeted point, indication of the center point, indication of the width, and indication of the height, in accordance with the methods described above.

Figure 11:
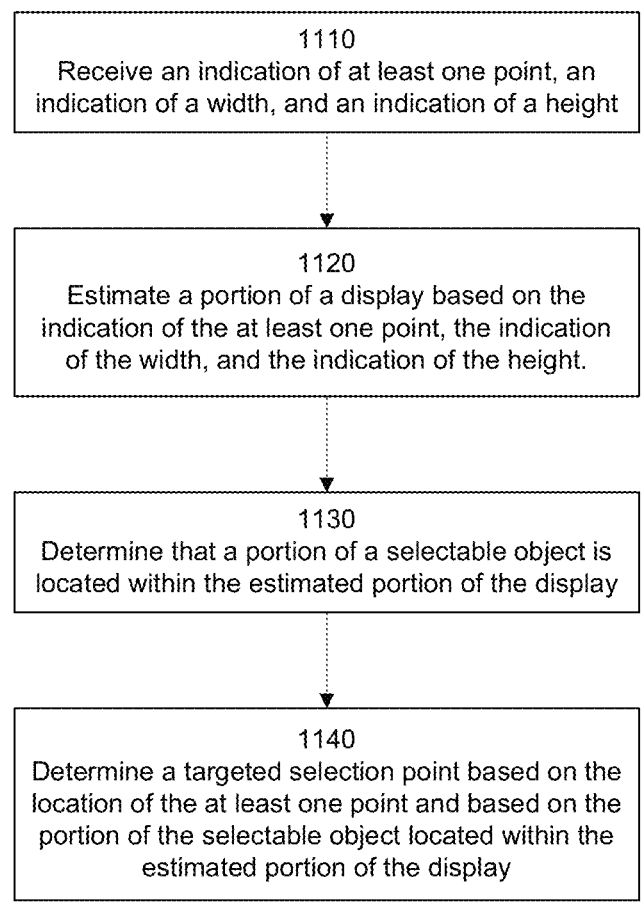
FIG. 11 depicts a representation of a method according to an embodiment of determining a targeted object.

FIG. 11 depicts a representation of a method according to an embodiment of the present inventions. An indication of at least one point, an indication of a width, and an indication of a height are received 1110. The indication of at least one point can include an indication of a center point, and indication of a touch point, an indication of another point, or any combination thereof. A portion of a display is estimated 1120 based on the indication of the at least one point, the indication of the width, and the indication of the height. A portion of an object is determined 1130 to be located within the estimated portion of the display. A targeted object is determined 1140 based on the location of the at least one point and based on the portion of the object within the estimated portion of the display.

Figure 12:
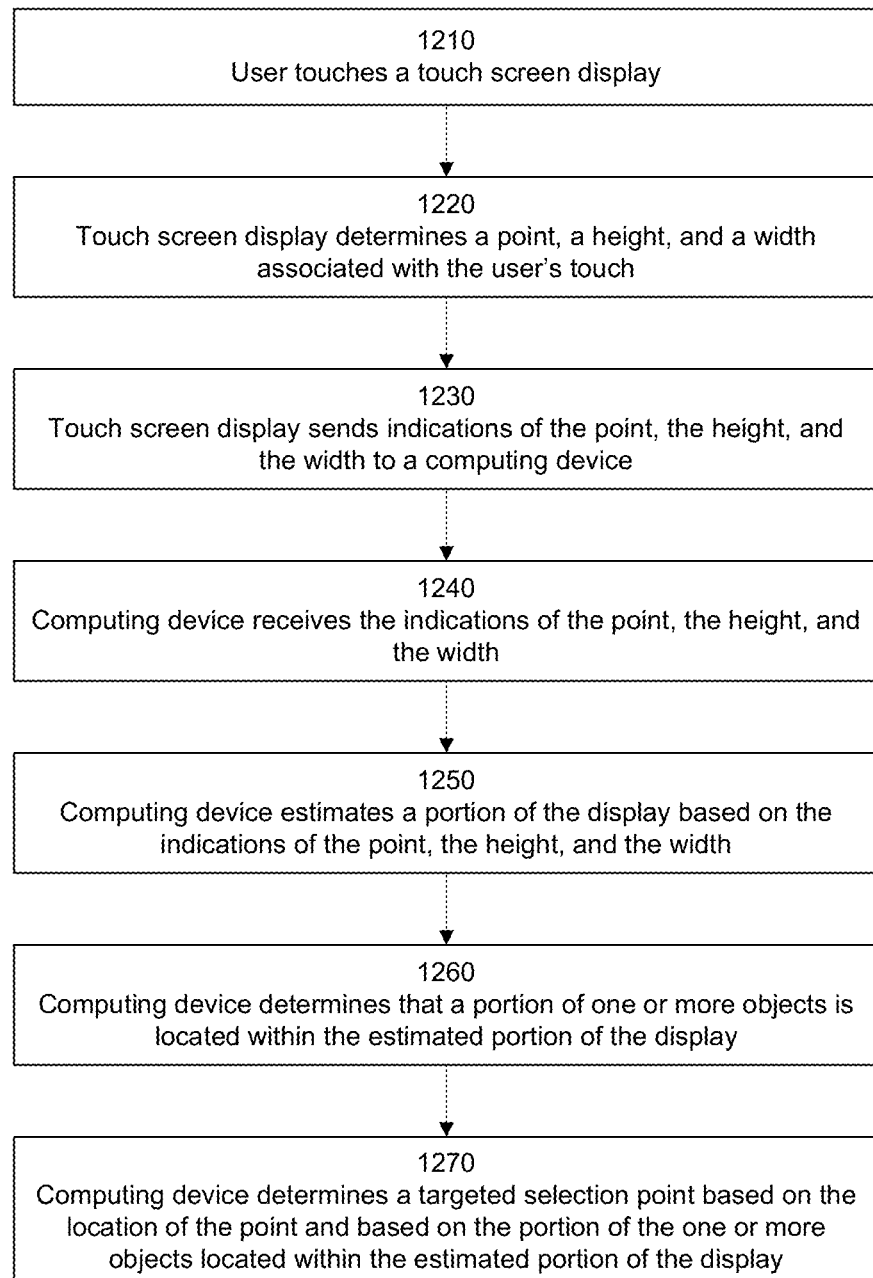
FIG. 12 depicts a representation of an example sequence of events leading to a determination of a targeted point.

FIG. 12 depicts a representation of a example sequence of events leading to a determination of a targeted point. A user touches 1210 a touch screen display. The touch screen display determines 1220 a point, a width, and a height based on the user's touch of the touch screen display. The touch screen display sends 1230 indications of the point, the height, and the width to a computing device. The computing device receives 1240 the indications of the point, the height, and the width to a computing device. The computing device estimates 1250 a portion of the display based on the indications of the point, the height, and the width. The computing device determines 1260 that at least a portion of one or more objects is located within the estimated portion of the display. The computing device determines 1270 a targeted point based on the location of the point and based on the portion of the one or more objects located within the estimated portion of the display.

Figure 13:
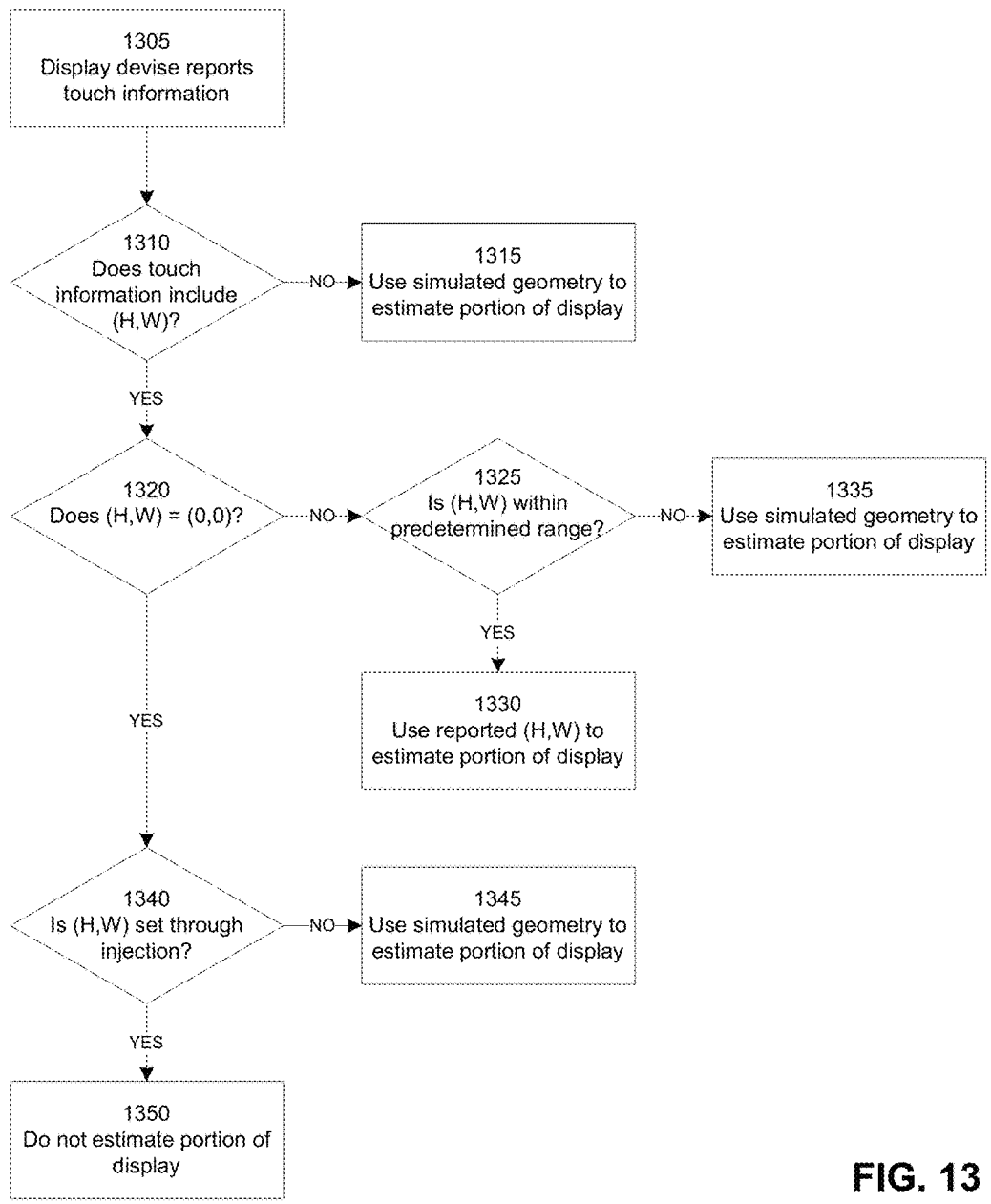
FIG. 13 depicts a method of determining whether a computing device uses geometry reported by a display to estimate a portion of a display or whether the computing device uses simulated geometry to estimate a portion of a display.

Referring now to FIG. 13, depicted is a method of determining whether to use an indication of a height and an indication of a width provided by a display device or whether to use simulated geometry. Simulated geometry refers to geometry used by a computing device to estimate a portion of the display besides using geometry provided by a display device. For example, simulated geometry can be an estimate by the computing device of a width and a height of a contact area between a user and a display to estimate a portion of the display. In another example, the simulated geometry can be derived from previous indications of heights and widths, such as an average height of previous indications of heights and an average width of previous indications of widths.

As depicted in FIG. 13, a display device can report 1305 touch information to a computing device. The touch information can include one or more of a touch point, a center point, an indication of a width, and an indication of a height. The computing device can determine 1310 whether the touch information includes an indication of a height and an indication of a width, (H,W). If the touch information does not include (H,W), then the computing device uses 1315 simulated geometry to determine a portion of the display. If the touch information includes (H,W), then the computing device can determine 1320 whether (H,W) is not a null value, (0,0). If (H,W) does not equal (0,0), then the computing device can determine 1325 whether the values of (H,W) fall within a predetermined range. The predetermined range can be a range which is regarded as valid values of (H,W). If the values of (H,W) fall within the predetermined range, the computing device can use 1330 the values of (H,W) to estimate a portion of the display. If the values of (H,W) fall outside of the predetermined range, the computing device can use 1335 simulated geometry to estimate a portion of the display. In the case where the values of (H,W) are equal to (0,0), the computing device can determine 1340 whether the values of (H,W) are set through injection. If the values of (H,W) are set through injection, the computing device can use 1345 simulated geometry to estimate a portion of the display. If the values of (H,W) are not set through injection, the computing device does not estimate 1350 a portion of the display and proceeds without determining a targeted point.

While the present inventions have been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method of determining a targeted point shown on a display based on a user input, the method comprising:
   receiving an indication of at least one point selected from among a plurality of points within a portion of the display, an indication of a width, and an indication of a height;

estimating a portion of the display based on the indication of the at least one point, the indication of the width, and the indication of the height;

determining that at least a portion of one or more objects is located within the estimated portion of the display;

determining the targeted point of the one or more objects based on a location of the at least one point and the portion of the one or more objects within the estimated portion of the display, wherein, when two or more objects are located within the estimated portion of display and a second object encompasses a greater portion within the estimated portion of the display than a portion of the first object within the estimated portion of the display, determining the targeted point is at the first object and not the second object comprises determining that the at least one point is located within the first object and determining that the second object does not contain the at least one point;

determining an offset between the at least one point and the targeted point of the one or more objects, wherein the offset represents a distance between the at least one point and the targeted point of the one or more objects;

receiving an indication of a change in the location of the at least one point; and changing a size or location of the one or more objects such that the offset between the at least one point and the targeted point of the one or more objects is maintained.

2. The method of claim 1, wherein the at least one point comprises an estimated touch point on the display and an estimated center point on the display.

3. The method of claim 1, wherein determining the targeted point comprises determining the targeted point based on a distance between the location of the at least one point and each portion of the one or more objects within the estimated portion of the display and based on a rank associated with each of the one or more objects.

4. The method of claim 1, wherein the one or more objects comprise a first object in a first framework and a second object in a second framework.

5. The method of claim 4, wherein a first rank associated with the first object is provided by the first framework.

6. The method of claim 5, further comprising:
assigning a second rank to the second object.

7. The method of claim 6, further comprising:
weighting a distance between the at least one point and the first object based on the first rank; and
weighting a distance between the at least one point and the second object based on the second rank;
wherein determining the targeted point comprises determining the targeted point based on the weighted distance between the first point and the first object and based on the weighted distance between the first point and the second object.

8. The method of claim 1, wherein determining the targeted point comprises determining that a portion of the one or more objects is located within the estimated portion of the display.

9. The method of claim 1, wherein determining the targeted point comprises determining the targeted point based on a likelihood that a user will select one of the one or more objects.

10. A system for determining a targeted point based on a user's interaction with a device, comprising:
a display device configured to display one or more objects; and
a computing device configured to:
receive an indication of at least one point, an indication of a width, and an indication of a height;
estimate a portion of the display based on the indication of the at least one point, the indication of the width, and the indication of the height;
determine that at least a portion of one or more objects is located within the estimated portion of the display;
determine the targeted point of the one or more objects based on a location of the at least one point and the portion of the one or more objects within the estimated portion of the display,
wherein, when two or more objects are located within the estimated portion of display and a second object encompasses a greater portion within the estimated portion of the display than a portion of the first object encompasses within the estimated portion of the display, determining the targeted point is at the first object and not the second object comprises determine that the at least one point is located within the first object and determine that the second object does not contain the at least one point;
determine an offset between the at least one point and the targeted point of the one or more objects,
wherein the offset represents a distance between the at least one point and the targeted point of the one or more objects;
receive an indication of a change in the location of the at least one point; and
change a size or location of the one or more objects such that the offset between the at least one point and the targeted point of the one or more objects is maintained.

11. The computing device of claim 10, wherein the display device comprises a touch screen display and wherein the estimated portion of the display is an estimation of the portion of the touch screen display contacted by the user.

12. The computing device of claim 10, wherein the computing device is further configured to determine the targeted point based on a distance between the at least one point and each portion of the one or more objects within the estimated portion of the display.

13. The computing device of claim 12, wherein the computing device is further configured to determine the targeted point based on a rank associated with each of the one or more objects.

14. The computing device of claim 10, wherein the computing device is further configured to determine that a portion of the one or more objects is located within the estimated portion of the display.

15. The computing device of claim 10, wherein the computing device is further configured to determine the targeted point based on a likelihood that a user will select one of the one or more objects.

16. A computer readable storage device have instructions embodied thereon for determining a targeted point based on a user's touch of a touch screen display, the instructions comprising:
instructions to receive an indication of at least one point, an indication of a width, and an indication of a height;
instructions to estimate a portion of the display based on the indication of the at least one point, the indication of the width, and the indication of the height;
instructions to determine that at least a portion of one or more objects is located within the estimated portion of the display;

instructions to determine the targeted point of the one or more objects based on a location of the at least one point and the portion of the one or more objects within the estimated portion of the display,
  wherein, when two or more objects are located within the estimated portion of display and a second object encompasses a greater portion within the estimated portion of the display than a portion of the first object within the estimated portion of the display, determining the targeted point is at the first object and not the second object comprises instructions to determine that the at least one point is located within the first object and instructions to determine that the second object does not contain the at least one point;
instructions to determine an offset between the at least one point and the targeted point of the one or more objects,
  wherein the offset represents a distance between the at least one point and the targeted point of the one or more objects;
instructions to receive an indication of a change in the location of the at least one point; and
instructions to change a size or location of the one or more objects such that the offset between the at least one point and the targeted point of the one or more objects is maintained.

17. The computer readable storage device of claim 16, wherein the instructions to estimate a portion of the display comprise instructions to estimate the portion of the display as an ellipse centered about the at least one point.

18. The computer readable storage device of claim 17, wherein the ellipse has a height corresponding to the indication of the height and a width corresponding to the indication of the width.

19. The computer readable storage device of claim 17, wherein the instructions to estimate a portion of the display comprise instructions to estimate the portion of the display as an ellipse inscribed inside of a rectangle centered about the at least one point, the rectangle having a height corresponding to the indication of the height and a width corresponding to the indication of the width.

* * * * *